United States Patent
Eriksson et al.

(10) Patent No.: US 12,462,440 B2
(45) Date of Patent: Nov. 4, 2025

(54) IMAGE-BASED SEARCHES FOR TEMPLATES

(71) Applicant: Adobe Inc., San Jose, CA (US)

(72) Inventors: Brian Eriksson, San Jose, CA (US); Wei-ting Hsu, San Jose, CA (US); Santiago Pombo, San Francisco, CA (US); Sandilya Bhamidipati, Mountain View, CA (US); Rida Khan, Saratoga, CA (US); Ravali Devarapalli, San Jose, CA (US); Maya Christmas Davis, San Francisco, CA (US); Lam Wing Chan, Sunnyvale, CA (US); Konstantin Blank, Seattle, WA (US); Jason Omid Kafil, Los Angeles, CA (US); Di Ni, San Jose, CA (US)

(73) Assignee: Adobe Inc., San Jose, CA (US)

( * ) Notice: Subject to any disclaimer, the term of this patent is extended or adjusted under 35 U.S.C. 154(b) by 484 days.

(21) Appl. No.: 17/988,377

(22) Filed: Nov. 16, 2022

(65) Prior Publication Data

US 2024/0161347 A1    May 16, 2024

(51) Int. Cl.
*G06T 11/00* (2006.01)
*G06V 10/70* (2022.01)

(52) U.S. Cl.
CPC ............ *G06T 11/00* (2013.01); *G06V 10/768* (2022.01); *G06T 2200/24* (2013.01); *G06T 2210/22* (2013.01)

(58) Field of Classification Search
None
See application file for complete search history.

(56) References Cited

U.S. PATENT DOCUMENTS

| | | | |
|---|---|---|---|
| 11,481,751 B1 * | 10/2022 | Chaubard | G06V 10/82 |
| 12,210,516 B1 * | 1/2025 | Zhu | G06F 16/2425 |
| 2023/0306087 A1 * | 9/2023 | Krishnan | G06F 16/583 |
| 2023/0419717 A1 * | 12/2023 | Kobori | G06V 10/778 |

\* cited by examiner

*Primary Examiner* — James A Thompson
(74) *Attorney, Agent, or Firm* — FIG. 1 Patents

(57) ABSTRACT

In implementations of image-based searches for templates, a computing device implements a search system to generate an embedding vector that represents an input digital image using a machine learning model. The search system identifies templates that include a candidate digital image to be replaced by the input digital image based on distances between embedding vector representations of the templates and the embedding vector that represents the input digital image. A template of the templates is determined based on a distance between an embedding vector representation of the candidate digital image included in the template and the embedding vector that represents the input digital image. The search system generates an output digital image for display in a user interface that depicts the template with the candidate digital image replaced by the input digital image.

20 Claims, 11 Drawing Sheets
(7 of 11 Drawing Sheet(s) Filed in Color)

Fig. 3

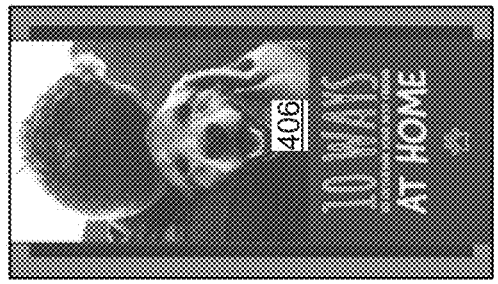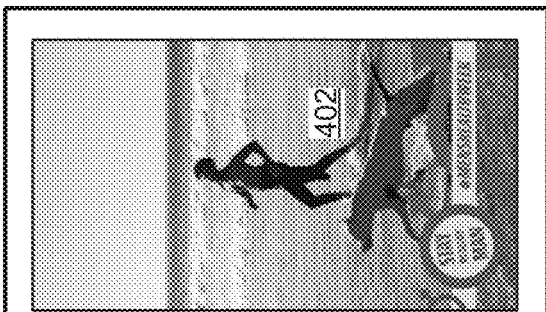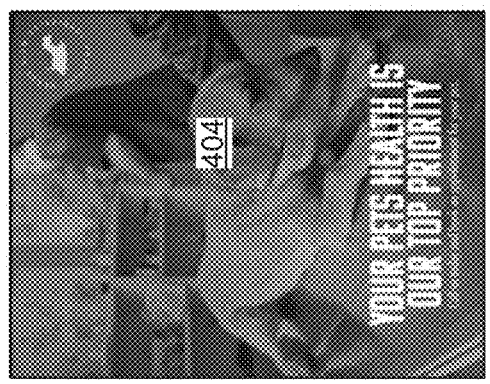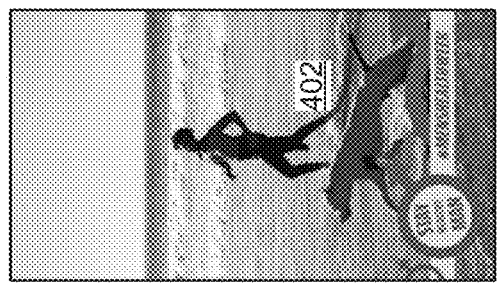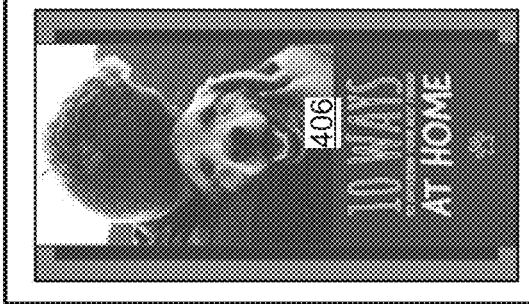
Fig. 4

800

802
Generate an embedding vector that represents an input digital image using a machine learning model

804
Identify templates based on the embedding vector that represents the input digital image, the templates each include a corresponding candidate digital image to be replaced by the input digital image

806
Determine a subset of the templates based on the embedding vector that represents the input digital image

808
Generate output digital images for display in a user interface, each of the output digital images depicts a template included in the subset with the corresponding candidate digital image replaced by the input digital image

*Fig. 8*

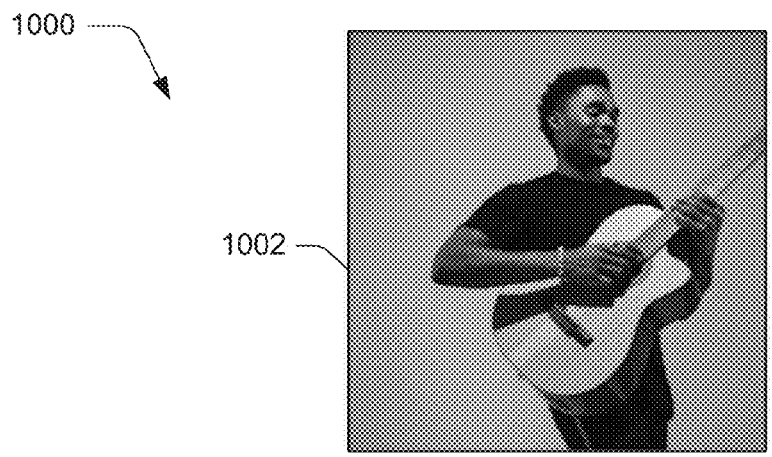
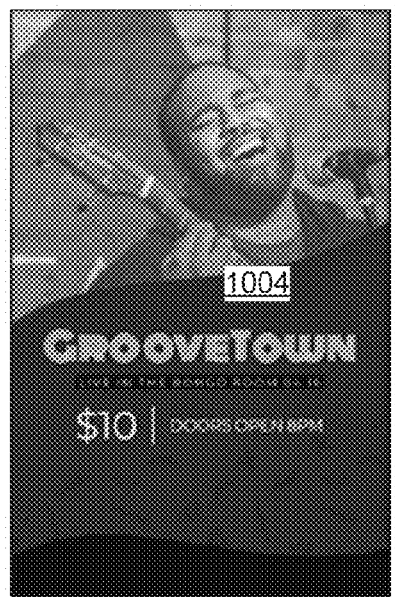
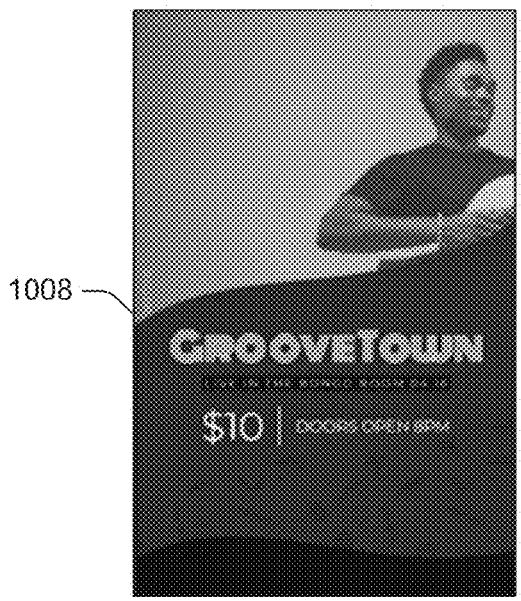
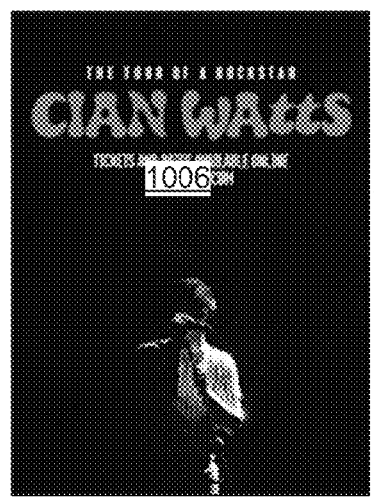
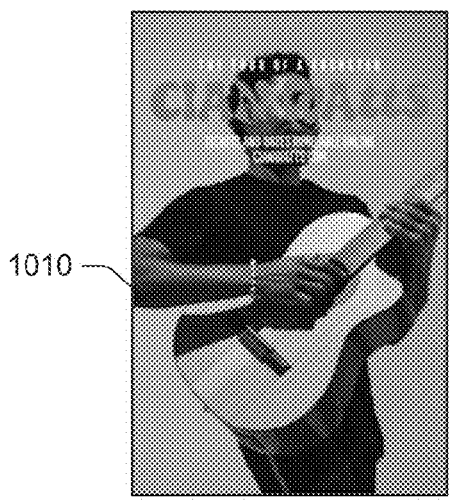
Fig. 10

IMAGE-BASED SEARCHES FOR TEMPLATES

BACKGROUND

A digital template is a type of digital content that is typically created by a digital artist as including visually pleasing content for an example context. The digital template is made available to users, for example, as part of a database of digital templates available via a network. A user retrieves an editable version of the digital template (e.g., from the database), and the user edits the digital template by modifying the example context based on the user's context.

SUMMARY

Techniques and systems for image-based searches for templates are described. In an example, a computing device implements a search system to generate an embedding vector that represents an input digital image in an embedding space. For example, the search system generates the embedding vector that represents the input digital image using a machine learning model trained on training data to generate embeddings for images such that embeddings generated for images associated with semantically similar intent phrases are separated by a relatively small distance in the embedding space.

The search system identifies templates that include a candidate digital image to be replaced by the input digital image based on distances between embedding vector representations of the templates and the embedding vector that represents the input digital image. In one example, a template of the templates is determined based on a distance between an embedding vector representation of the candidate digital image included in the template and the embedding vector that represents the input digital image. The search system generates an output digital image for display in a user interface that depicts the template with the candidate digital image replaced by the input digital image.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures are indicative of one or more entities and thus reference is made interchangeably to single or plural forms of the entities in the discussion.

FIG. 3 illustrates a representation of template data and input data.

FIG. 4 illustrates a representation of templates identified and ordered based on an input digital image.

FIG. 8 is a flow diagram depicting a procedure in an example implementation in which output digital images are generated that each depict a template included in a subset of templates with a corresponding candidate digital image replaced by an input digital image.

FIG. 10 illustrates a representation of editable templates generated based on an input digital image.

DETAILED DESCRIPTION

Figure 1:
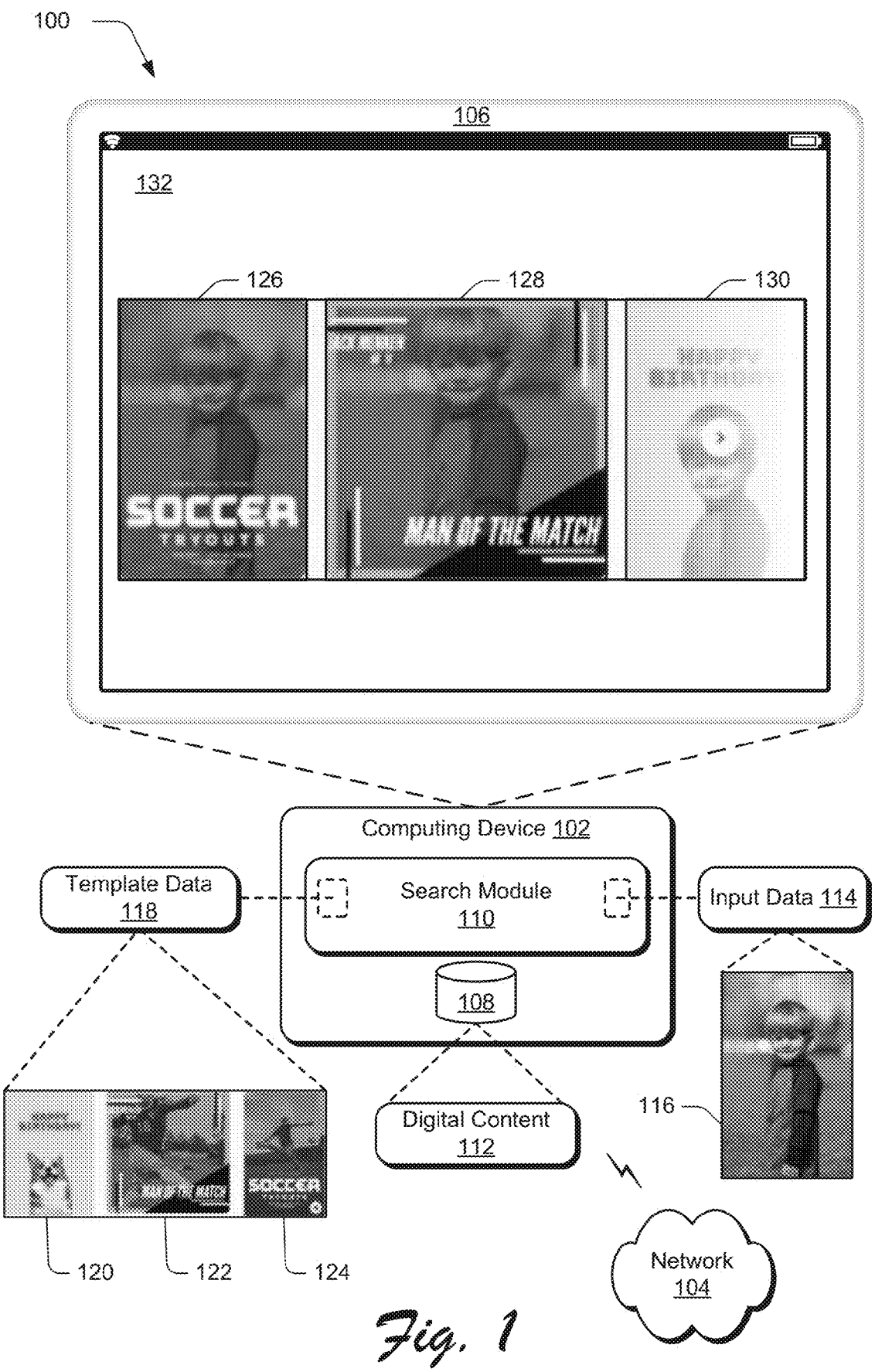
FIG. 1 is an illustration of an environment in an example implementation that is operable to employ digital systems and techniques for image-based searches for templates as described herein.

Conventional systems for searching for templates included in a database of thousands of templates are limited to using keywords and categories. For instance, a user attempting to identify a particular template to receive a digital image performs keyword searches for the particular template which return hundreds (or thousands) of results. Alternatively, the user manually browses through hundreds (or thousands) of templates included in a category that is related to the particular template. If the user is able to identify the particular template, then the user manually modifies the digital image (e.g., resizes the image, applies a filter to the image, etc.) to be included in the particular template which is inefficient and prone to user error.

In order to overcome these limitations, techniques and systems for image-based searches for templates are described. For example, a computing device implements a search system receive input data describing a digital image to be included in a template of a collection of templates. In this example, a user interacts with an input device (e.g., a mouse, a touchscreen, a stylus, a keyboard, etc.) to transmit the input data describing the digital image to the search system via a network. In one example, the collection of templates includes thousands of different digital templates such as templates for flyers, menus, resumes, business cards, greeting cards, invitations, brochures, etc. The search system generates an embedding vector that represents the digital image in an embedding space.

In an example, the search system generates the embedding vector that represents the digital image using a machine learning model. The machine learning model is trained on training data to generate embeddings for input images such that embeddings generated for input images associated with semantically similar intent phrases are separated by a relatively small distance in the embedding space and embeddings generated for input images associated with semantically dissimilar intent phrases are separated by a relatively large distance in the embedding space. The search system searches template data describing the collection of templates to identify templates that include a candidate digital image to be replaced by the digital image by comparing the embedding vector that represents the digital image to embedding vector representations of templates included in the collection of templates.

In an optional embodiment, the search system excludes templates from the search of the template data that include multiple candidate digital images. In this optional embodiment, excluding these templates from the search of the template data generally increases a likelihood that identified templates depicting the digital image will be aesthetically pleasing. In another optional embodiment, the search system excludes templates from the search of the template data that include single candidate digital images having dimensions that are smaller than threshold dimensions (e.g., small-scale candidate digital images) which also increases the likelihood that identified templates depicting the digital image will be visually pleasing.

The search system identifies the templates that include the candidate digital image based on distances between the embedding vector that represents the digital image and embedding vector representations of the templates. For instance, the embedding vector representations of the identified templates are a relatively small distance from the embedding vector that represents the digital image in the embedding space. In one embodiment, the search system ranks or reorders the identified templates into an order based on computed distances between embedding vector representations of the candidate digital images included in the identified templates and the embedding vector that represents the digital image. In an example, the search system also generates cropped or modified versions of the digital image that have dimensions appropriate for replacing the candidate digital images included in the identified templates. The search system generates output digital images for display in a user interface in the order that each depict one of the identified templates with the corresponding candidate digital image replaced by the digital image (e.g., replaced by a modified or cropped version of the digital image).

Unlike conventional systems which are limited to searching for templates to receive the digital image based on keywords and/or categories, the described systems are capable of generating the output digital images as depicting templates associated with intent phrases that are semantically similar to intent phrases associated with the digital image. Because the output digital images also depict the modified or cropped versions of the digital image, it is possible for the user to visualize how the digital image appears in the identified templates which is not possible using conventional systems. For example, the user interacts with the input device to select one of the output digital images that depicts a particular template, and the search system generates an editable version of the particular template that includes a cropped/modified version of the digital image instead of the candidate digital image which is also not possible in conventional systems. Moreover, computing distances between the embedding vector representations is computationally efficient such that the described systems are capable of identifying the templates and generating the output digital images in substantially real time. As a result of this efficiency, the described systems are implementable to search large template databases (e.g., including thousands of templates) in online applications via the network.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. In an example, the computing device 102 includes a storage device 108 and a search module 110. The storage device 108 is illustrated to include digital content 112 such as digital images, digital artwork, digital videos, etc.

The search module 110 is illustrated as having, receiving, and/or transmitting input data 114 describing a digital image 116 which is to be included in a template described by template data 118. For example, a user interacts with an input device (e.g., a mouse, a keyboard, a stylus, a touchscreen, etc.) to transmit the digital image 116 to the search module 110 via the network 104. As shown, the digital image 116 depicts a child standing on a soccer field wearing a soccer jersey.

In one example, the search module 110 receives the input data 114 describing the digital image 116 as a search input for searching the template data 118 which is available via the network 104. The template data 118 describes thousands of templates included in a template repository (e.g., a database of templates). Due to the large number and wide variety of templates described by the template data 118, it is burdensome for the user to attempt to identify a particular template for receiving the digital image 116 through interaction with the input device, e.g., by performing keyword searches for the particular template. For instance, the template data 118 describes many different templates for flyers, menus, resumes, posts, logos, thumbnails, collages, business cards, greeting cards, invitations, brochures, album covers, worksheets, book covers, etc.

In order to identify templates for receiving the digital image 116, the search module 110 searches the template data 118 for templates having candidate digital images which are replaceable with the digital image 116. In an example, the search module 110 excludes templates from the search of the template data 118 that have multiple digital images. In this example, excluding templates with multiple digital images from the search of the template data 118 increases a likelihood that identified templates will be visually pleasing with the digital image 116. In another example which also increases the likelihood that identified templates depicting the digital image 116 will be visually pleasing, the search module 110 excludes templates from the search of the template data 118 which have small-scale digital images (e.g., having dimensions smaller than threshold dimensions).

Consider an example in which the search module 110 generates an embedding vector that represents the digital image 116 in an embedding space using a machine learning model. As used herein, the term "machine learning model" refers to a computer representation that is tunable (e.g., trainable) based on inputs to approximate unknown functions. By way of example, the term "machine learning model" includes a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, the machine learning model is capable of including, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. By way of example, a machine learning model makes high-level abstractions in data by generating data-driven predictions or decisions from the known input data.

Continuing the previous example, the search module 110 generates the embedding vector that represents the digital image 116 using a machine learning model trained on training data using natural language supervision. The training data describes digital images with intent phrase classifications, and the machine learning model is trained to receive an input digital image and generate embeddings for intent phrases associated with the input digital image. Examples of intent phrases associated with the digital image 116 that depicts the child standing on the soccer field include "child," "boy," "soccer," "sports," "soccer field," "jersey," and so forth.

The search module 110 searches the template data 118 by comparing the embedding vector that represents the digital image 116 with embedding vector representations of templates (e.g., embedding vector representations of intent phrases associated with the templates) described by the template data 118. This comparison includes computing distances between the embedding vector that represents the digital image 116 and embedding vector representations of templates which are not excluded from the search of the template data 118. For example, a computed distance between the embedding vector that represents the digital image 116 and an embedding vector representation of a particular template is relatively small if intent phrases associated with the particular template are similar (e.g., semantically similar) to intent phrases associated with the digital image 116. Conversely, the computed distance is relatively large if the intent phrases associated with the particular template are not similar to the intent phrases associated with the digital image 116.

The search module 110 identifies templates 120-124 based on distances (e.g., as having smallest distances or relatively small distances compared to other templates described by the template data 118) between the embedding vector that represents the digital image 116 and embedding vector representations of the templates 120-124. For example, each of the templates 120-124 is associated with an intent phrase that is semantically similar to an intent phrase associated with the digital image 116. As shown in FIG. 1, template 120 includes a candidate digital image depicting a small dog and text which states "HAPPY BIRTHDAY;" template 122 includes a candidate digital image depicting a rugby player and text that states "MAN OF THE MATCH;" and template 124 includes a candidate digital image depicting a soccer player and text that states "SOCCER TRYOUTS."

After identifying the templates 120-124 from the search of the template data 118, the search module 110 leverages the trained machine learning model to generate an embedding vector representation of the candidate digital image included in each of the templates 120-124. The search module 110 then computes distances between the embedding vector that represents the digital image 116 and the embedding vector representations of the candidate digital images included the templates 120-124. For example, the search module 110 also generates a cropped version of the digital image 116 for each of the templates 120-124. In this example, the search module 110 generates a first cropped version of the digital image 116 having dimensions appropriate for replacing the candidate digital image depicting the small dog in the template 120; a second cropped version of the digital image 116 having dimensions appropriate for replacing the candidate digital image depicting the rugby player in the template 122; and a third cropped version of the digital image 116 having dimensions appropriate for replacing the candidate digital image depicting the soccer player in the template 124.

The search module 110 uses the cropped versions of the digital image 116 and the distances between the embedding vector that represents the digital image 116 and the embedding vector representations of the candidate digital images to generate and display output digital images 126-130 which are rendered in a user interface 132 of the display device 106. As shown, output digital image 126 depicts the template 124 with the candidate digital image depicting the soccer player replaced by the third cropped version of the digital image 116 which includes visual features applied by the template 124. For instance, the template 124 applies a filter to the third cropped version of the digital image 116 which causes the third cropped version of the digital image 116 to appear green in the output digital image 126.

As further shown, output digital image 128 depicts the template 122 with the candidate digital image depicting the rugby player replaced by the second cropped version of the digital image 116. The template 122 applies a red filter to the second cropped version of the digital image 116 which is depicted in the output digital image 128. Output digital image 130 depicts the template 120 with the candidate digital image depicting the small dog replaced by the first cropped version of the digital image 116 which includes visual features applied by the template 120. The applied visual features remove a background from the first cropped version of the digital image 116 such that the soccer field depicted in the digital image 116 is not depicted in the output digital image 130. In the illustrated example, the template 120 also applies a filter to the first cropped version of the digital image 116 which causes the first cropped version of the digital image 116 to appear yellow in the output digital image 130.

The search module 110 displays the output digital images 126-130 in the user interface 132 in an order based on the computed distances between the embedding vector that represents the digital image 116 and the embedding vector representations of the candidate digital images. For example, the output digital image 126 is displayed before the output digital images 128, 130 because a distance between the embedding vector that represents the digital image 116 and the embedding vector representation of the candidate digital image depicting the soccer player is smaller than corresponding distances between the embedding vector that represents the digital image 116 and the embedding vectors representations of the candidate digital images depicting the rugby player and the small dog, respectively. Similarly, the output digital image 128 is displayed before the output digital image 130 because a distance between the embedding vector that represents the digital image 116 and the embedding vector representation of the candidate digital image depicting the rugby player is smaller than a distance between the embedding vector that represents the digital image 116 and the embedding vector representation of the candidate digital image depicting the small dog.

By generating and displaying the output digital images 126-130 in response to receiving the input data 114 describing the digital image 116, the search module 110 identifies the templates 120-124 from the thousands of templates described by the template data 118 and also illustrates (e.g., to the user) how the digital image 116 appears when it is modified and included in each of the templates 120-124. For example, the user interacts with the input device relative to the user interface 132 to select the output digital image 126. In this example, the search module 110 receives the input data 114 as describing the selection of the output digital image 126, and the search module 110 processes the input data 114 to display the candidate digital image depicting the soccer player and/or to generate an editable version of the template 124 that includes the third cropped version of the digital image 116 instead of the candidate digital image depicting the soccer player.

Figure 2:
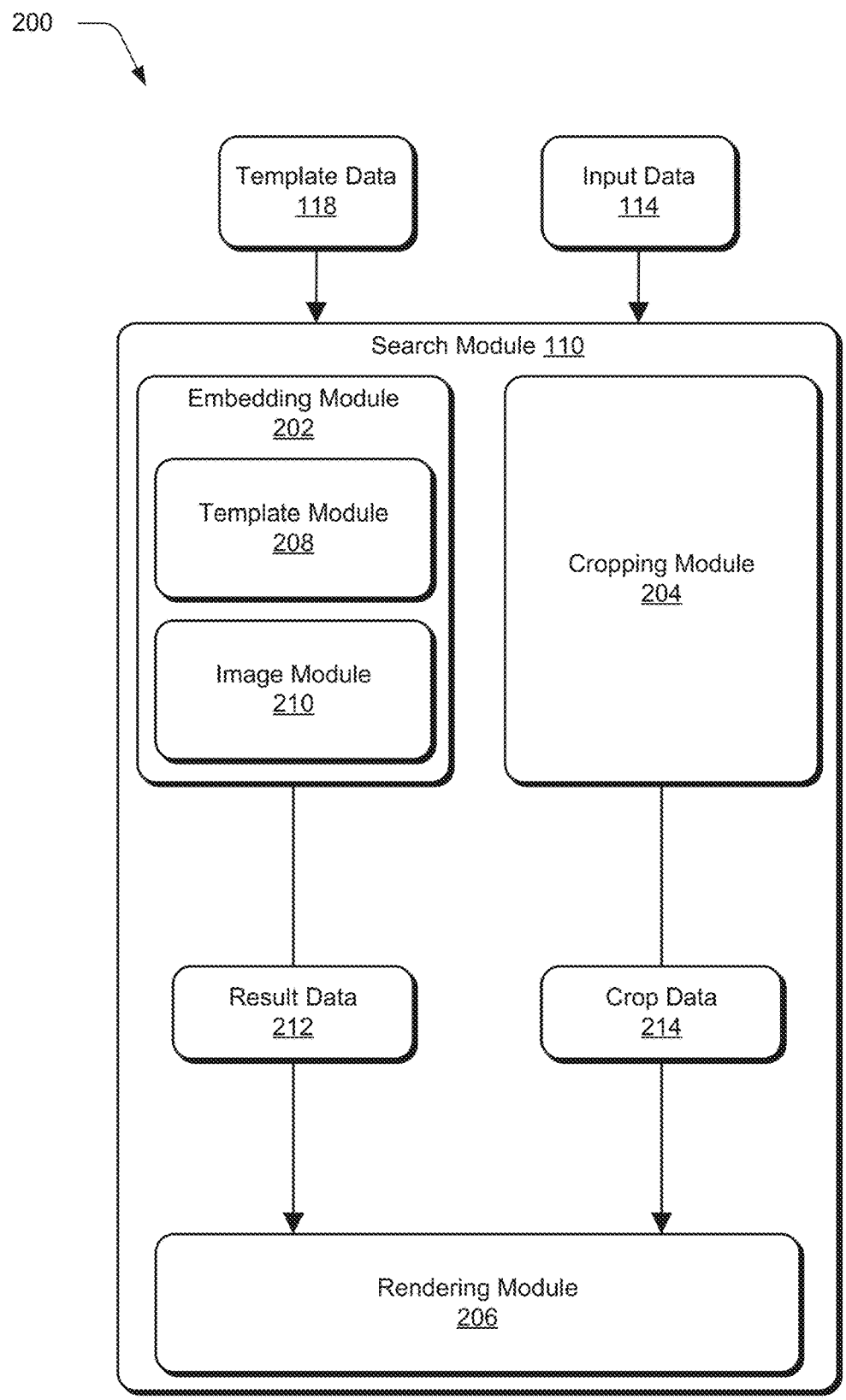
FIG. 2 depicts a system in an example implementation showing operation of a search module for image-based searches for templates.

FIG. 2 depicts a system 200 in an example implementation showing operation of a search module 110. The search module 110 is illustrated to include an embedding module 202, a cropping module 204, and a rendering module 206. For instance, the embedding module 202 is illustrated as including a template module 208 and an image module 210. In an example, the search module 110 receives and/or accesses input data 114 and template data 118.

FIG. 3 illustrates a representation 300 of template data and input data. The representation 300 includes templates 302 described by the template data 118 and a digital image 304 described by the input data 114. For instance, the templates 302 are representative of thousands of different digital templates described by the template data 118 and included in a template repository (e.g., a template database) which is available to the search module 110 via the network 104.

In one example, a user interacts with an input device (e.g., a mouse, a stylus, a keyboard, a touchscreen, a microphone, etc.) to transmit the input data 114 to the search module 110 via the network 104. The search module 110 receives the input data 114 as describing the digital image 304 which is to be included in one template or multiple templates included in the templates 302. As shown, the digital image 304 depicts a golden retriever sitting in a field of grass. For example, the embedding module 202 receives and processes the input data 114 and the template data 118 to identify templates to receive the digital image 304.

The embedding module 202 includes a machine learning model that is trained on training data using natural language supervision to receive input digital images associated with intent phrases and generate embeddings in an embedding space for the intent phrases associated with the input digital images. For example, the machine learning model generates embeddings such that embeddings generated for semantically similar intent phrases are separated by a relatively small distance in the embedding space and embeddings generated for semantically dissimilar intent phrases are separated by a relatively large distance in the embedding space. In one example, the machine learning model includes an image encoder (e.g., an image feature extractor) and a text encoder (e.g., a linear classifier) which are jointly trained on the training data to correctly predict pairs of a digital image and a sequence of text which describes intent phrases associated with the digital image.

For example, the embedding module 202 implements the trained machine learning model to generate an embedding vector that represents the digital image 304 (e.g., intent phrases associated with the digital image 304) in the embedding space. Examples of intent phrases associated with the digital image 304 include "dog," "pet," "golden retriever," etc. The template module 208 searches the template data 118 to identify templates included in the templates 302 to receive the digital image 304 using the embedding vector that represents the digital image 304.

To do so in one example, the template module 208 filters the template data 118 by excluding ones of the templates 302 from the search of the template data 118 that do not include any candidate digital images to be replaced with the digital image 304. Optionally in some examples, the template module 208 also excludes ones of the templates 302 from the search of the template data 118 that have multiple digital images and that have single digital images with image dimensions that are smaller than threshold image dimensions (e.g., small-scale digital images). For instance, the template module 208 computes distances between the embedding vector that represents the digital image 304 and embedding vector representations of ones of the templates 302 (e.g., generated using the trained machine learning model) that are not excluded from the search of the template data 118.

In one example, the template module 208 computes the distances in the embedding space as cosine distances (e.g., based on cosine similarity) between the embedding vector that represents the digital image 304 and the embedding vector representations of ones of the templates 302 described by the template data 118. In other examples, the template module 208 computes the distances in the embedding space as Manhattan distances, Hamming distances, Minkowski distances, Euclidean distances, and so forth. The template module 208 identifies a subset of the templates 302 that are associated with intent phrases which are semantically similar to intent phrases associated with the digital image 304 based on the computed distances in the embedding space.

In an example, the template module 208 identifies the subset of the templates 302 as including all the templates described by the template data 118 (and not excluded from the search of the template data 118) represented by embedding vectors that are less than a threshold distance from the embedding vector that represents the digital image 304 in the embedding space. In another example, the template module 208 identifies the subset of the templates 302 as corresponding to a top N embedding vector representations having a smallest distance from the embedding vector that represents the digital image 304 in the embedding space. It is to be appreciated that in various examples, the top N embedding vector representations includes three templates, five templates, 10 templates, 15 templates, etc. For example, the user interacts with the input device to define a maximum number of ones of the templates 302 to be included in the subset of the templates 302 identified by the template module 208.

FIG. 4 illustrates a representation 400 of templates identified and ordered based on an input digital image. For example, the template module 208 identifies the subset of the templates 302 as including templates 402-406 from the search of the template data 118. Template 402 includes a first candidate digital image depicting a man and a dog running near an ocean and text which states "MENSHEALTH-WEEK" and "STAY HEALTHY MAN." Examples of intent phrases associated with the template 402 include "man," "dog," "running," and so forth.

As shown in the representation 400, template 404 includes a second candidate digital image depicting a dog on an examination table at a veterinary clinic and text that states "YOUR PETS HEALTH IS OUR TOP PRIORITY." Examples of intent phrases associated with the template 404 include "dog," "pet," "veterinary clinic," etc. Template 406 includes a third candidate digital image depicting a man holding a golden retriever and text which states "10 WAYS TO ENTERTAIN YOUR BEST FRIEND AT HOME." Examples of intent phrases associated with the template 406 include "man," "dog," "golden retriever," and so forth.

The image module 210 determines a ranking or an ordering of the templates 402-406 included in the subset of the templates 302 based on the candidate digital images to be replaced by the digital image 304. To do so in an example, the image module 210 uses the trained machine learning model to generate an embedding vector that represents the first candidate digital image included in the template 402, an embedding vector that represents the second candidate digital image included in the template 404, and an embedding vector that represents the third candidate digital image included in the template 406. For example, the image module 210 computes a first distance in the embedding space between the embedding vector that represents the digital image 304 and the embedding vector that represents the first candidate digital image; a second distance in the embedding space between the embedding vector that represents the digital image 304 and the embedding vector that represents the second candidate digital image; and a third distance in the embedding space between the embedding vector that represents the digital image 304 and the embedding vector that represents the third candidate digital image.

For instance, the image module 210 arranges the templates 402-406 in an order 408 based on the first, second, and third computed distances in the embedding space. In the illustrated example, the third distance in the embedding space is smaller than the first and second distances in the embedding space, and the image module 210 arranges the template 406 first in the order 408. The second distance in the embedding space is smaller than the first distance in the embedding space and the image module 210 arranges the template 404 second in the order 408. The first distance in the embedding space is larger than the second and third distances in the embedding space. As a result, the image module 210 orders the template 402 third in the order 408.

For example, the embedding module 202 generates result data 212 as describing the order 408. Although the image module 210 is described as ordering all of the templates 402-406 included in the subset of the templates 302 in the order 408 described by the result data 212, it is to be appreciated that in some examples, the order 408 only includes some of the templates 402-406 included in the subset of the templates 302. Consider an example in which the subset of the templates 302 includes 10 templates described by the template data 118 that each have a candidate digital image to be replaced by the digital image 304. In this example, the image module 210 computes a distance in the embedding space between the embedding vector that represents the digital image 304 and embedding vectors that represent each of the 10 candidate digital images. Continuing the example, the image module 210 includes the templates 406, 404, 402 in the order 408 because the first, second, and third distances in the embedding space are smaller than distances between the embedding vectors that represent the other seven candidate digital images and the embedding vector that represents the digital image 304 in the embedding space.

Figure 5:
FIG. 5 illustrates a representation of cropped versions of an input digital image.

FIG. 5 illustrates a representation 500 of cropped versions of an input digital image. The cropping module 204 receives and processes the template data 118 and the input data 114 to generate crop data 214. For example, the cropping module 204 processes the input data 114 describing the digital image 304 to generate a first cropped image 502 having dimensions appropriate for replacing the third candidate digital image in the template 406. In the illustrated example, the cropping module 204 generates the first cropped image 502 by performing a center crop on the digital image 304 based on dimensions of the third candidate digital image. In other examples, the cropping module 204 performs other operations relative to the digital image 304 to generate the first cropped image 502 such as saliency mapping, object boundary detection, background removal, etc.

For example, the cropping module 204 generates a second cropped image 504 having dimensions appropriate for replacing the second candidate digital image in the template 404 and a third cropped image 506 having dimensions appropriate for replacing the first candidate digital image in the template 402. The cropping module 204 generates the second and third cropped images 504, 506 by performing center crops on the digital image 304 based on dimensions of the second and first candidate digital images, respectively. In one example, the cropping module 204 generates the crop data 214 as describing cropped digital images 508.

Figure 6:
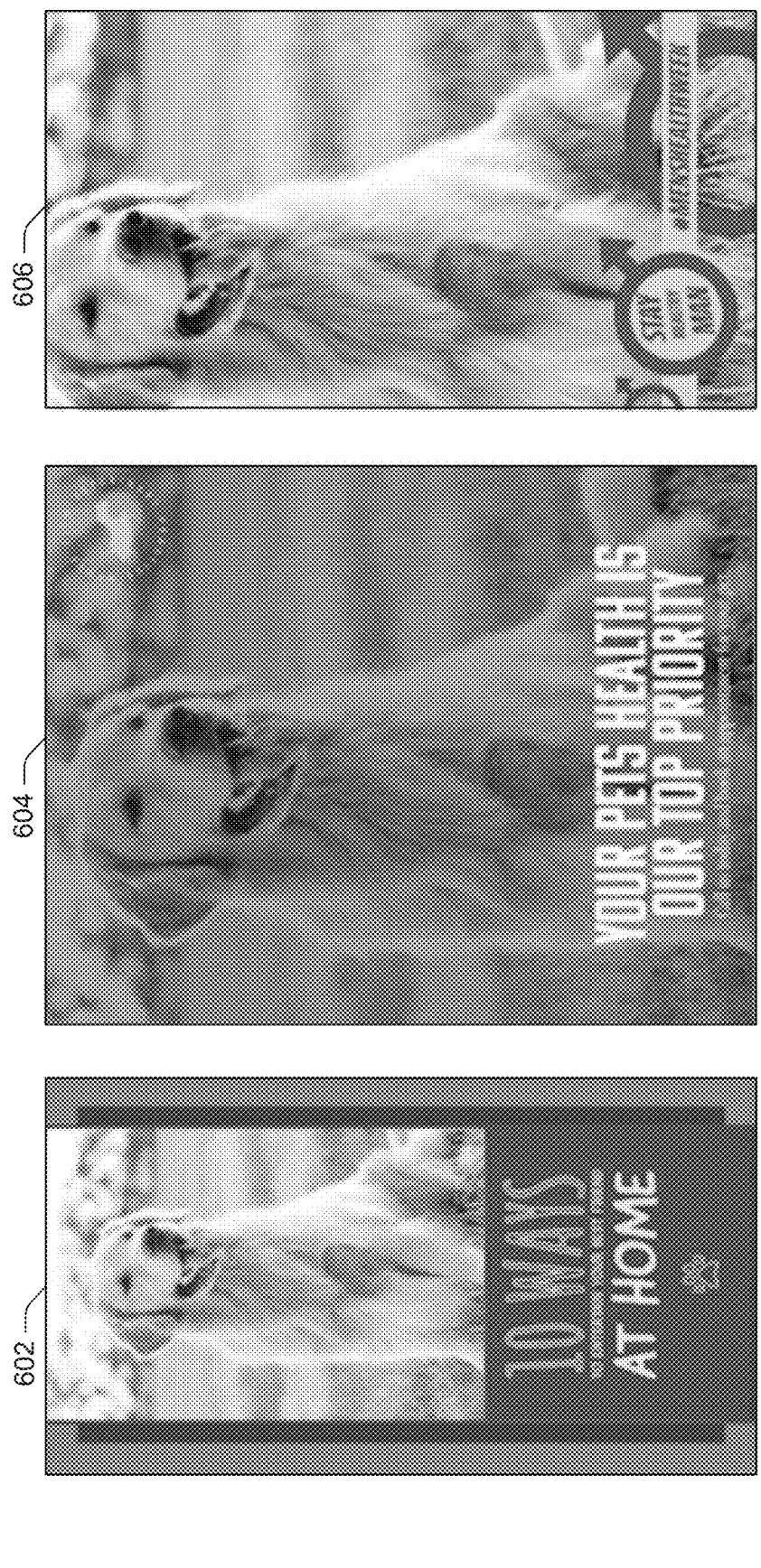
FIG. 6 illustrates a representation of output digital images depicting templates including an input digital image.

FIG. 6 illustrates a representation 600 of output digital images depicting templates including an input digital image. In an example, the rendering module 206 receives and processes the result data 212 describing the order 408 and the crop data 214 describing the cropped digital images 508 to generate output digital images 602-606. For example, the rendering module 206 generates the output digital images 602-606 for display in the user interface 132 of the display device 106. As shown in the representation 600, output digital image 602 depicts the template 406 with the third candidate digital image replaced by the first cropped image 502. For instance, the third candidate digital image is in a position of a z-order of portions of digital content included in the template 406 such that the text which states "10 WAYS TO ENTERTAIN YOUR BEST FRIEND AT HOME" is displayed over a bottom portion of the third candidate digital image in the template 406. The output digital image 602 depicts the first cropped image 502 in the position of the z-order such that the text which states "10 WAYS TO ENTERTAIN YOUR BEST FRIEND AT HOME" is disposed over a bottom portion of the first cropped image 502 in the output digital image 602.

Output digital image 604 depicts the template 404 with the second candidate digital image replaced by the second cropped image 504. The template 404 applies a visual feature to the second candidate digital image, e.g., a filter which causes the second candidate digital image to appear darkened in the template 404. In the illustrated example, the output digital image 604 also depicts the second cropped image 504 as having the visual feature (e.g., the applied filter which causes the second cropped image 504 to appear darkened in the output digital image 604).

In the representation 600, output digital image 606 depicts the template 402 with the first candidate digital image replaced by the third cropped image 506. The first candidate digital image is a position of a z-order of portions of digital content included in the template 402 such that the text stating "STAY HEALTHY MAN" is disposed over a bottom portion of the first candidate digital image in the template 402. Similarly, the output digital image 606 depicts the third cropped image 506 in the position of the z-order such that the text stating "STAY HEALTHY MAN" is disposed over a bottom portion of the third cropped image 506 in the output digital image 606.

Although described as generating the output digital images 602-606, the rendering module 206 is also capable of generating editable templates having the digital image 304 instead of a candidate digital image included in the template. Consider an example in which the user interacts with the input device to transmit the input data 114 describing the digital image 304 to the search module 110 via the network 104. The search module 110 receives and processes the input data 114 to generate the embedding vector that represents the digital image 304 in the embedding space. For example, the search module 110 generates the embedding vector that represents the digital image 304 using the trained machine learning model. Continuing the example, the search module 110 searches the template data 118 by computing distances between the embedding vector that represents the digital image 304 in the embedding space and embedding vector representations of ones of the templates 302 in the embedding space.

For instance, searching the template data 118 in this manner is computationally efficient such that the search module 110 is capable of searching thousands of ones of the templates 302 described by the template data 118 in substantially real time via the network 104. The search module 110 identifies the templates 402-406 as being represented by embedding vectors in the embedding space that are a minimal distance from the embedding vector that represents the digital image 304 in the embedding space. After reordering the templates 402-406 in the order 408 based on distances between embedding vector representations of the first, second, and third candidate digital images and the embedding vector that representants the digital image 304, the search module 110 generates the cropped digital image 508 by cropping the digital image 304 (e.g., center cropping the digital image 304).

Continuing this example, the search module 110 generates the output digital images 602-606 to display to the user (e.g., in the user interface 132 of the display device 106). For example, generating the output digital images 602-606 is computationally efficient and the search module 110 is capable of generating the output digital images 602-606 in substantially real time via the network 104. The user views the output digital images 602-606 and interacts with the input device to generate the input data 114 as describing a selection of the output digital image 602. In response to receiving the input data 114 in this example, the search module 110 generates an editable version of the template 406 that includes the first cropped image 502 instead of the third candidate digital image. In one example, the search module 110 generates the editable version of the template 406 for display in the user interface 132 and the user interacts with the input device, e.g., to modify or edit the editable version of the template 406. In an alternative example, the user interacts with the input device to generate the input data 114 as describing a request to generate additional output digital images depicting additional ones of the templates 302. In this alternative example, the search module 110 generates the additional output digital images that depict the additional ones of the templates 302 in substantially real time.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 7:
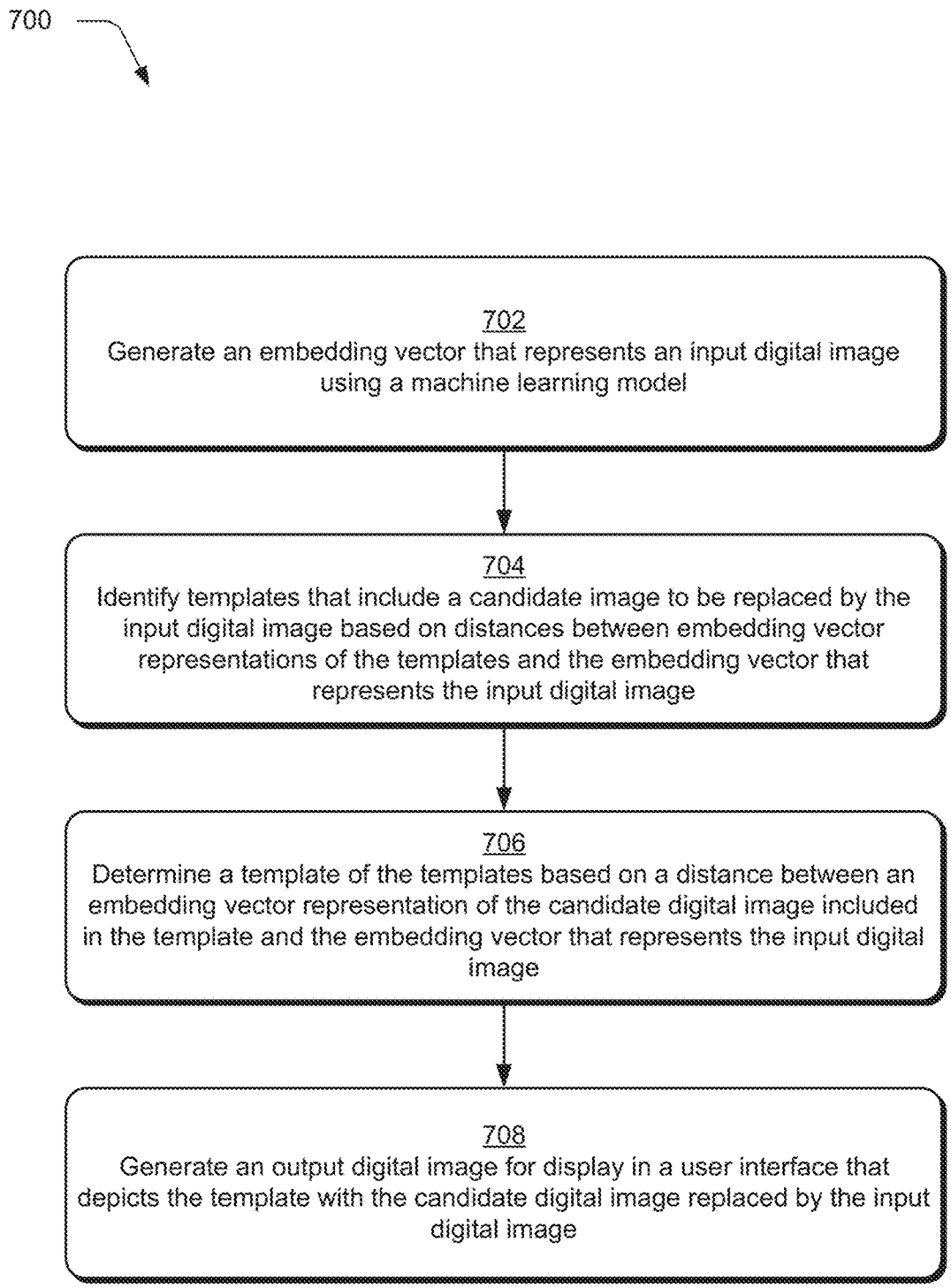
FIG. 7 is a flow diagram depicting a procedure in an example implementation in which an output digital image is generated for display in a user interface that depicts a template with a candidate digital image replaced by an input digital image.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-6. FIG. 7 is a flow diagram depicting a procedure 700 in an example implementation in which an output digital image is generated for display in a user interface that depicts a template with a candidate digital image replaced by an input digital image.

An embedding vector is generated that represents an input digital image using a machine learning model (block 702). In an example, the computing device 102 implements the search module 110 to generate the embedding vector that represents the input digital image. Templates are identified that include a candidate digital image to be replaced by the input digital image based on distances between embedding vector representations of the templates and the embedding vector that represents the input digital image (block 704). For example, the search module 110 identifies the templates based on the distances.

A template is determined of the templates based on a distance between an embedding vector representation of the candidate digital image included in the template and the embedding vector that represents the input digital image (block 706). The computing device 102 implements the search module 110 to determine the template of the templates in some examples. An output digital image is generated for display in a user interface that depicts the template with the candite digital image replaced by the input digital image (block 708). In one example, the search module 110 generates the output digital image for display in the user interface.

FIG. 8 is a flow diagram depicting a procedure 800 in an example implementation in which output digital images are generated that each depict a template included in a subset of templates with a corresponding candidate digital image replaced by an input digital image. An embedding vector is generated that represents an input digital image using a machine learning model (block 802). For example, the computing device 102 implements the search module 110 to generate the embedding vector that represents the input digital image.

Templates are identified based on the embedding vector that represents the input digital image, the templates each include a corresponding candidate digital image to be replated by the input digital image (block 804). In some examples, the search module 110 identifies the templates based on the embedding vector that represents the input digital image. A subset of the templates is determined based on the embedding vector that represents the input digital image (block 806). In one example, the search module 110 determines the subset of the templates. Output digital images are generated for display in a user interface, each of the output digital images depicts a template included in the subset with the corresponding candidate digital image replaced by the input digital image (block 808). In an example, the computing device 102 implements the search module 110 to generate the output digital images for display in the user interface.

Figure 9:
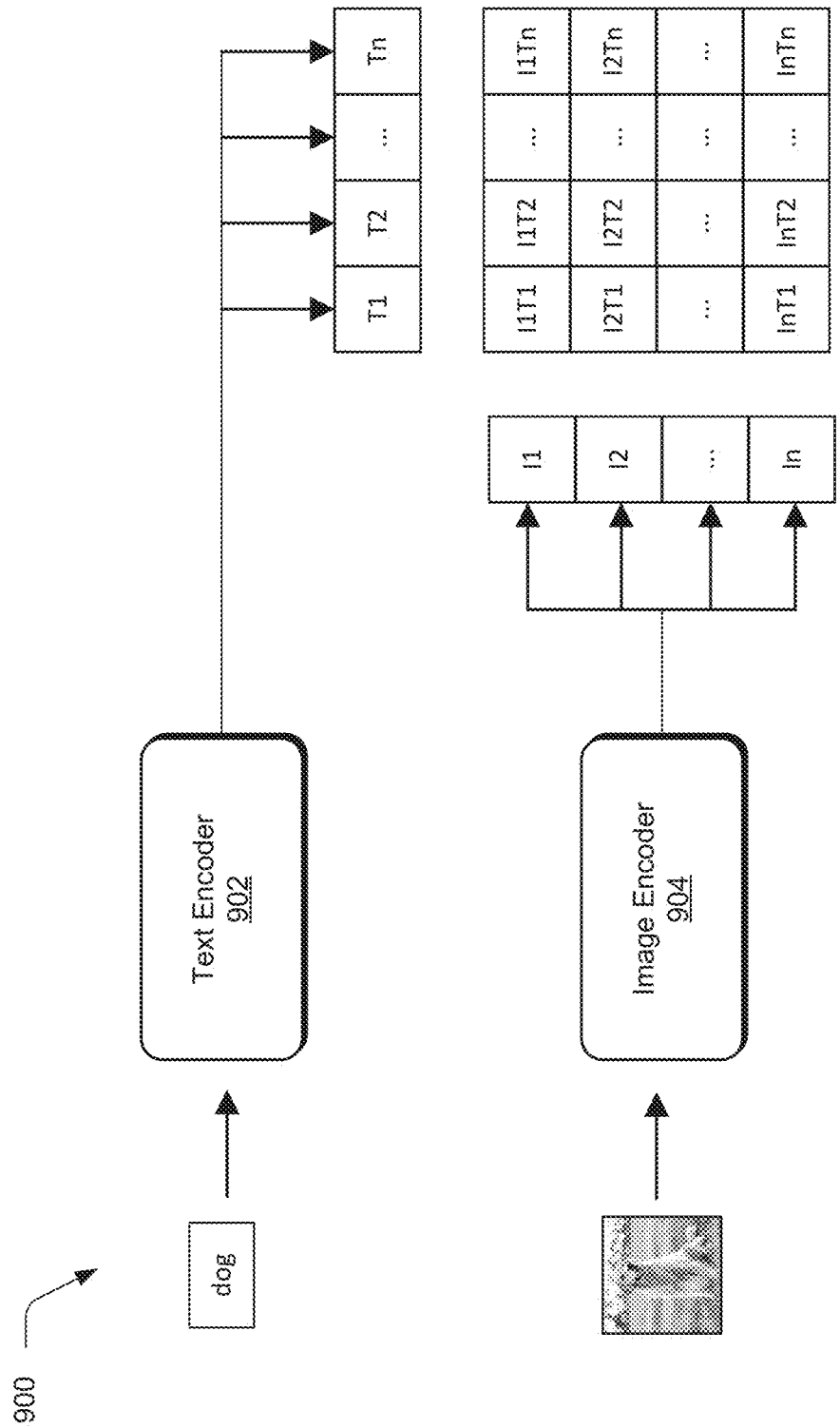
FIG. 9 illustrates a representation of training a machine learning model.

FIG. 9 illustrates a representation 900 of training a machine learning model. As shown in the illustrated example, the machine learning model includes a text encoder 902 and an image encoder 904. For example, the text encoder 902 includes a linear classifier and the image encoder 904 includes an image feature extractor. The text encoder 902 and the image encoder 904 are jointly trained on training data describing pairs of digital images and sequences of text (e.g., intent phrases) to correctly predict the pairs of digital images and sequences of text using natural language supervision. In one example, the text encoder 902 and the image encoder 904 are jointly trained on a positive training sample that includes a digital image depicting a dog and a sequence of text that includes an intent phrase of "dog." As part of training the machine learning model in this example, a distance between an embedding vector generated by the text encoder 902 and an embedding vector generated by the image encoder 904 is minimized. Similarly, the text encoder 902 and the image encoder 904 are jointly trained on a negative training sample that includes the digital image depicting the dog and a sequence of text that includes an intent phrase of "cat" such that a distance between an embedding vector generated by the text encoder 902 and an embedding vector generated by the image encoder 904 is maximized.

FIG. 10 illustrates a representation 1000 of editable templates generated based on an input digital image. For instance, the representation 1000 includes an input digital image 1002 that depicts a man playing a guitar. In an example, the search module 110 receives the input data 114 as describing the input digital image 1002. The search module 110 generates an embedding vector that represents the input digital image 1002 in an embedding space using the trained machine learning model.

The search module 110 searches the template data 118 by computing distances between the embedding vector that represents the input digital image 1002 and embedding vector representations of templates described by the template data 118. For example, the search module 110 identifies a first template 1004 and a second template 1006 based on the search of the template data 118. The first template 1004 includes a candidate digital image that depicts a man playing guitar and the second template 1006 includes a candidate digital image that depicts a man singing. The search module 110 uses the input digital image 1002 and the first template 1004 to generate an editable template 1008 that includes the input digital image 1002 instead of the candidate digital image that depicts the man playing the guitar. Similarly, the search module 110 uses the input digital image 1002 and the second template 1006 to generate an editable template 1010 that includes the input digital image 1002 instead of the candidate digital image that depicts the man singing.

Example System and Device

Figure 11:
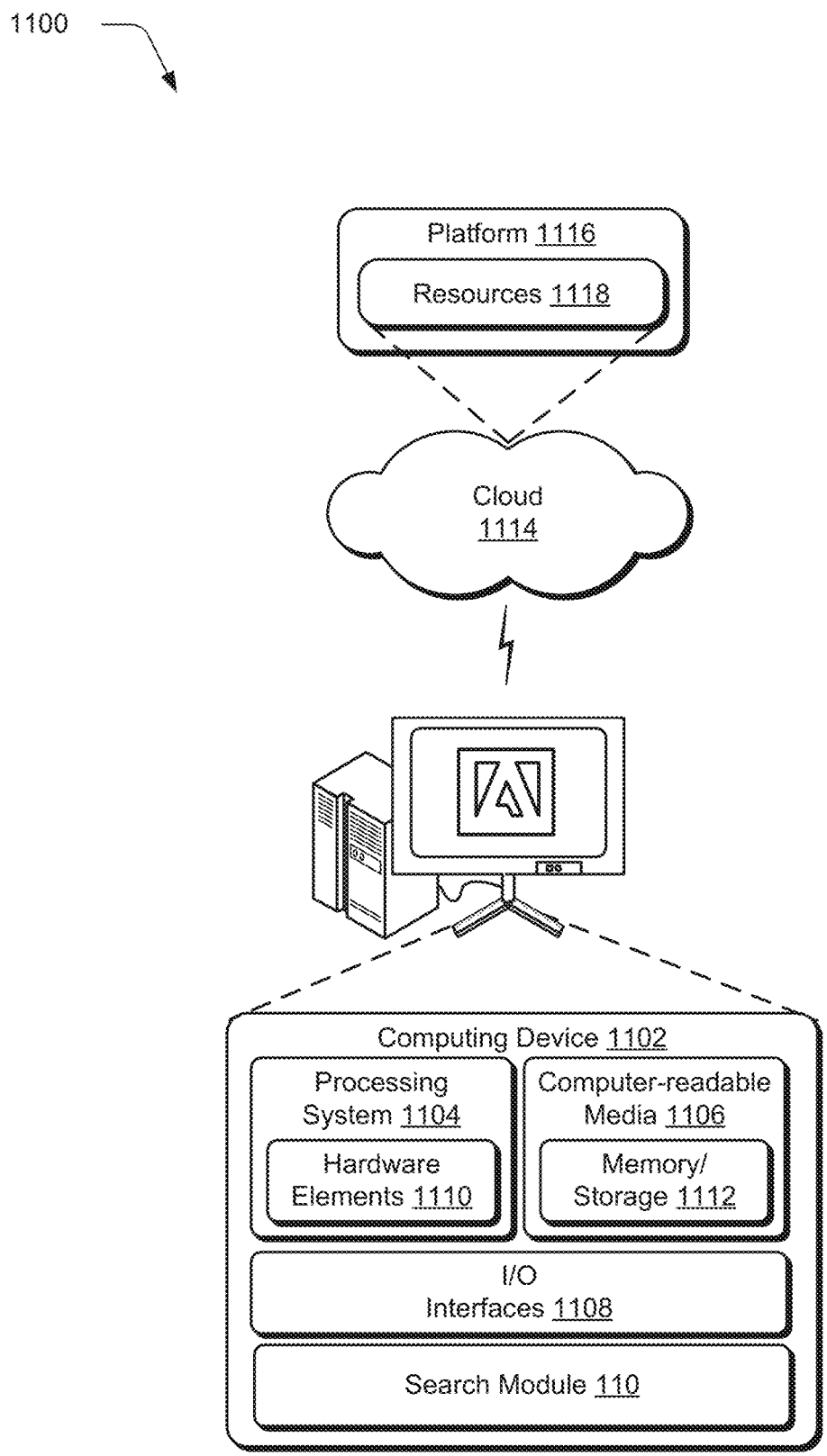
FIG. 11 illustrates an example system that includes an example computing device that is representative of one or more computing systems and/or devices for implementing the various techniques described herein.

FIG. 11 illustrates an example system 1100 that includes an example computing device that is representative of one or more computing systems and/or devices that are usable to implement the various techniques described herein. This is illustrated through inclusion of the search module 110. The computing device 1102 includes, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interfaces 1108 that are communicatively coupled, one to another. Although not shown, the computing device 1102 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware elements 1110 that are configured as processors, functional blocks, and so forth. This includes example implementations in hardware as an application specific integrated circuit or other logic device formed using one or more semiconductors. The hardware elements 1110 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 1106 is illustrated as including memory/storage 1112. The memory/storage 1112 represents memory/storage capacity associated with one or more computer-readable media. In one example, the memory/storage 1112 includes volatile media (such as random access memory (RAM)) and/or nonvolatile media (such as read only memory (ROM), Flash memory, optical disks, magnetic disks, and so forth). In another example, the memory/storage 1112 includes fixed media (e.g., RAM, ROM, a fixed hard drive, and so on) as well as removable media (e.g., Flash memory, a removable hard drive, an optical disc, and so forth). The computer-readable media 1106 is configurable in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 1102. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 1102, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 1110. For example, the computing device 1102 is configured to implement particular instructions and/or functions corresponding to the software and/or hardware modules. Accordingly, implementation of a module that is executable by the computing device 1102 as software is achieved at least partially in hardware, e.g., through use of computer-readable storage media and/or hardware elements 1110 of the processing system 1104. The instructions and/or functions are executable/operable by one or more articles of manufacture (for example, one or more computing devices 1102 and/or processing systems 1104) to implement techniques, modules, and examples described herein.

The techniques described herein are supportable by various configurations of the computing device 1102 and are not limited to the specific examples of the techniques described herein. This functionality is also implementable entirely or partially through use of a distributed system, such as over a "cloud" 1114 as described below.

The cloud 1114 includes and/or is representative of a platform 1116 for resources 1118. The platform 1116 abstracts underlying functionality of hardware (e.g., servers) and software resources of the cloud 1114. For example, the resources 1118 include applications and/or data that are utilized while computer processing is executed on servers that are remote from the computing device 1102. In some examples, the resources 1118 also include services provided over the Internet and/or through a subscriber network, such as a cellular or Wi-Fi network.

The platform 1116 abstracts the resources 1118 and functions to connect the computing device 1102 with other computing devices. In some examples, the platform 1116 also serves to abstract scaling of resources to provide a corresponding level of scale to encountered demand for the resources that are implemented via the platform. Accordingly, in an interconnected device embodiment, implementation of functionality described herein is distributable throughout the system 1100. For example, the functionality is implementable in part on the computing device 1102 as well as via the platform 1116 that abstracts the functionality of the cloud 1114.

What is claimed is:

1. A method comprising:
    generating, by a processing device using a machine learning model, an embedding vector that represents a semantic intent of an input digital image;
    identifying, by the processing device, templates based on distances between embedding vector representations of semantic intent of the templates and the embedding vector that represents the semantic intent of the input digital image;

determining, by the processing device, a template of the identified templates based on a distance between an embedding vector representation of a semantic intent of a candidate digital image included in the template and the embedding vector that represents the semantic intent of the input digital image; and generating, by the processing device, an output digital image for display in a user interface that depicts the determined template as having the candidate digital image being replaced by the input digital image.

2. The method as described in claim 1, wherein the identifying includes searching a template repository based on embedding vector representations of templates included in the template repository and the embedding vector that represents the input digital image.

3. The method as described in claim 1, wherein the output digital image depicts a cropped version of the input digital image.

4. The method as described in claim 1, further comprising generating an editable version of the determined template that includes the input digital image instead of the candidate digital image.

5. The method as described in claim 1, wherein the determined template applies a visual feature to the candidate digital image, and the output digital image depicts the input digital image as having the visual feature.

6. The method as described in claim 1, further comprising generating the embedding vector representation of the candidate digital image using the machine learning model.

7. The method as described in claim 1, further comprising generating an additional output digital image that depicts an additional template of the identified templates with the candidate digital image included in the additional template as replaced by the input digital image.

8. The method as described in claim 7, wherein the output digital image and the additional output digital image are generated for display in the user interface in an order that is based on the embedding vector that represents the input digital image.

9. The method as described in claim 1, further comprising generating a digital image for display in the user interface that depicts the template with the candidate digital image.

10. The method as described in claim 1, wherein the machine learning model is trained on training data to generate embedding vectors for digital images and embedding vectors for templates in an embedding space based on semantic intent.

11. A system comprising:
a memory component; and
a processing device coupled to the memory component, the processing device to perform operations comprising:
generating an embedding vector that represents semantic intent of an input digital image, itself using a machine learning model;
identifying templates based on distances between embedding vector representations of semantic intent of the templates and the embedding vector that represents the semantic intent input digital image;
determining a template of the identified templates based on a distance between an embedding vector representation of a semantic intent of a candidate digital image included in the template and the embedding vector that represents the semantic intent of the input digital image; and
generating an output digital image for display in a user interface that depicts the determined template as having the candidate digital image being replaced by the input digital image.

12. The system as described in claim 11, wherein the template applies a visual feature to the candidate digital image, and the output digital image depicts the input digital image as having the visual feature.

13. The system as described in claim 11, wherein the output digital image depicts a cropped version of the input digital image.

14. The system as described in claim 11, wherein the input digital image is received as a search input to identify the templates and the output digital image is generated as a search result based on the search input.

15. The system as described in claim 11, wherein the operations further comprise generating an editable version of the determined template that includes the input digital image instead of the candidate digital image.

16. A non-transitory computer-readable storage medium storing executable instructions, which when executed by a processing device, cause the processing device to perform operations comprising:
generating an embedding vector that represents a semantic intent of an input digital image using a machine learning model by processing pixels of the input digital image;
identifying templates based on semantic intent, using the embedding vector that represents the input digital image, the templates each include a corresponding candidate digital image to be replaced by the input digital image;
determining a subset of the identified templates based on the embedding vector of the semantic intent of the input digital image and embedding vectors of semantic intent of the identified templates; and
generating output digital images for display in a user interface, each of the output digital images depicting a template included in the subset with the corresponding candidate digital image being replaced by the input digital image.

17. The non-transitory computer-readable storage medium as described in claim 16, wherein the output digital images are generated for display in the user interface in an order based on the embedding vector that represents the input digital image.

18. The non-transitory computer-readable storage medium as described in claim 16, wherein the input digital image is received as a search input to identify the templates and the output digital images are generated as search results based on the search input.

19. The non-transitory computer-readable storage medium as described in claim 16, wherein the operations further comprise generating an editable version of a template included in the subset, the editable version of the template includes the input digital image instead of the corresponding candidate digital image.

20. The non-transitory computer-readable storage medium as described in claim 16, wherein at least one of the output digital images depicts a cropped version of the input digital image.

* * * * *